(12) United States Patent
Katamreddy et al.

(10) Patent No.: US 12,317,203 B2
(45) Date of Patent: May 27, 2025

(54) THERMAL EFFICIENT METHOD TO MAINTAIN CV2X TIMING

(71) Applicant: QUALCOMM Incorporated, San Diego, CA (US)

(72) Inventors: Srujith Reddy Katamreddy, Ingolstadt (DE); Abha Khosla, San Diego, CA (US); Phani Kumar Dasam, Reading (GB); Mohammed Ataur Rahman Shuman, San Diego, CA (US); Soumya Das, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 370 days.

(21) Appl. No.: 17/652,429

(22) Filed: Feb. 24, 2022

(65) Prior Publication Data
US 2023/0269679 A1 Aug. 24, 2023

(51) Int. Cl.
*H04W 76/14* (2018.01)
*H04W 56/00* (2009.01)

(52) U.S. Cl.
CPC ......... *H04W 56/001* (2013.01); *H04W 76/14* (2018.02)

(58) Field of Classification Search
CPC .................................................. H04W 56/01
USPC ........................................................ 370/350
See application file for complete search history.

(56) References Cited

U.S. PATENT DOCUMENTS

2014/0247729 A1* 9/2014 Sahu ................ H04W 52/0261
370/252

FOREIGN PATENT DOCUMENTS

| WO | 0130040 A1 | 4/2001 |
| WO | 2020033795 A1 | 2/2020 |
| WO | WO-2023151794 A1 * | 8/2023 |

OTHER PUBLICATIONS

International Search Report and Written Opinion—PCT/US2022/053960—ISA/EPO—May 2, 2023.

* cited by examiner

*Primary Examiner* — Sibte H Bukhari
(74) *Attorney, Agent, or Firm* — QUALCOMM Incorporated

(57) ABSTRACT

Method and apparatus for maintaining C-V2X timing (e.g., in platoon scenarios). The apparatus of a slave UE determines a thermal condition of the respective slave UE within a platoon of UEs. The apparatus performs synchronization with a first synchronization source, directly or indirectly, based on the thermal condition of the slave UE. Synchronization is performed directly with the first synchronization source in response to a determination that the thermal condition of the slave UE is below a threshold. Synchronization is performed indirectly with the first synchronization source through a master UE within the platoon of UEs in response to a determination that the thermal condition exceeds a threshold. The apparatus may receive, from a master UE within the platoon of UEs, SLSS to synchronize indirectly to the first synchronization source through the master UE.

17 Claims, 15 Drawing Sheets

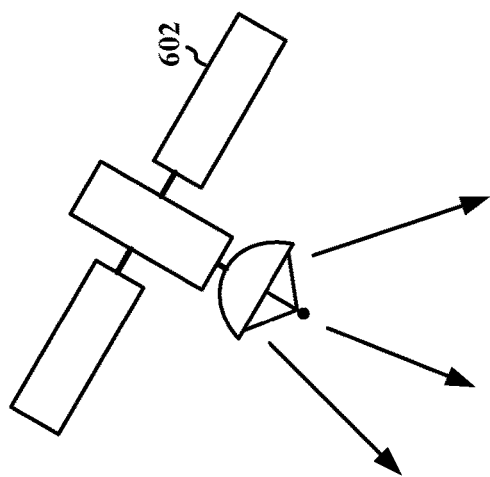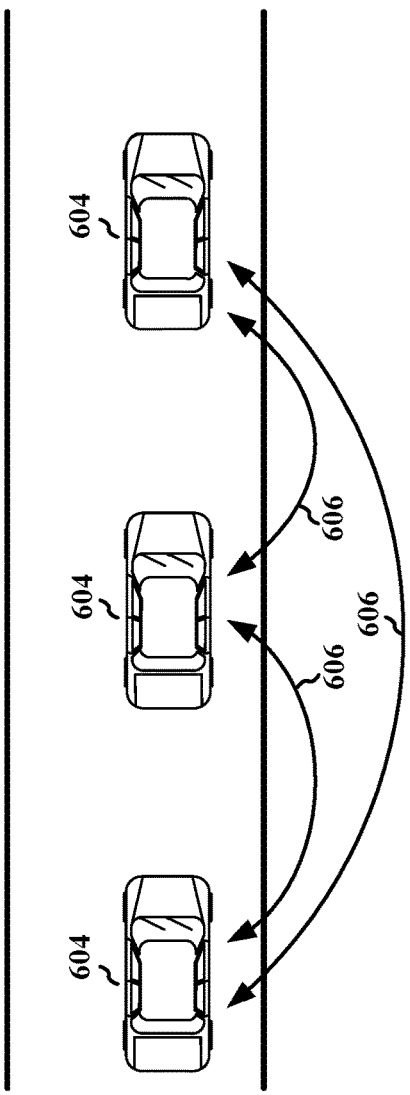
FIG. 6

THERMAL EFFICIENT METHOD TO MAINTAIN CV2X TIMING

TECHNICAL FIELD

The present disclosure relates generally to communication systems, and more particularly, to techniques and configurations for maintaining cellular vehicle to anything (C-V2X) timing (e.g., in platoon scenarios).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a slave UE. The device may be a processor and/or a modem at a slave UE or the slave UE itself. The apparatus determines a thermal condition of the slave UE within a platoon of UEs. The apparatus performs synchronization with a first synchronization source, directly or indirectly, based on the thermal condition of the slave UE.

In an aspect of the disclosure, a method, a computer-readable medium, and an apparatus are provided. The apparatus may be a device at a master UE. The device may be a processor and/or a modem at a master UE or the master UE itself. The apparatus determines a thermal condition of the master UE. The master UE and one or more slave UEs being within a platoon of UEs. The apparatus provides synchronization to a first synchronization source to at least one slave UE of the one or more slave UEs within the platoon of UEs based on a determined thermal condition of the master UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating an example of a C-V2X communication.

DETAILED DESCRIPTION

Figure 1:
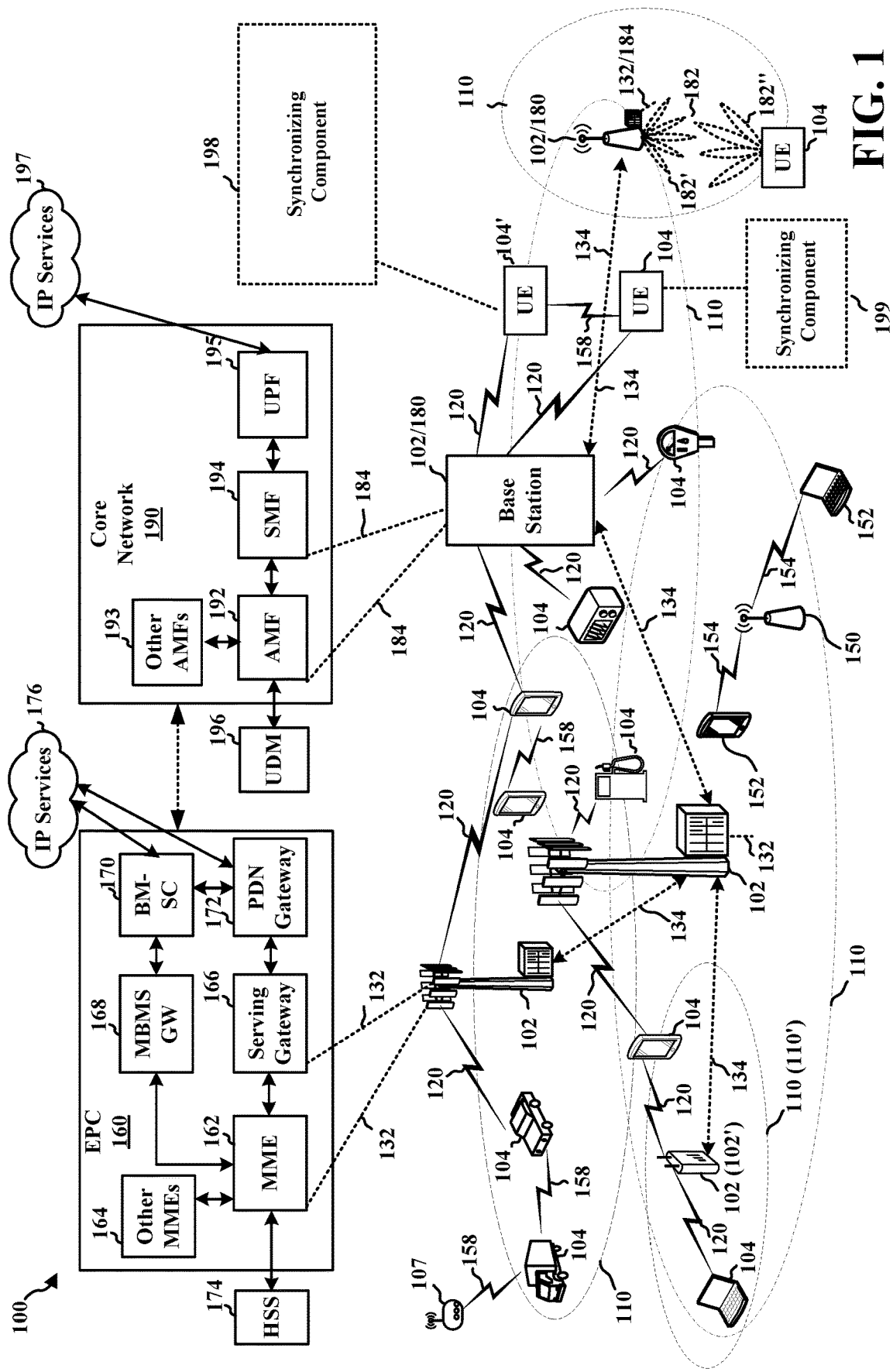
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a slave UE 104, or other device communicating based on sidelink, may include a synchronizing component 198 configured to perform synchronization with a first synchronization source, directly or indirectly, based on a thermal condition of the slave UE.

Referring again to FIG. 1, in certain aspects, a master UE 104, or other device communicating based on sidelink, may include a synchronizing component 199 configured to provide synchronization to a synchronization source to one or more slave UEs based on a thermal condition of the master UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
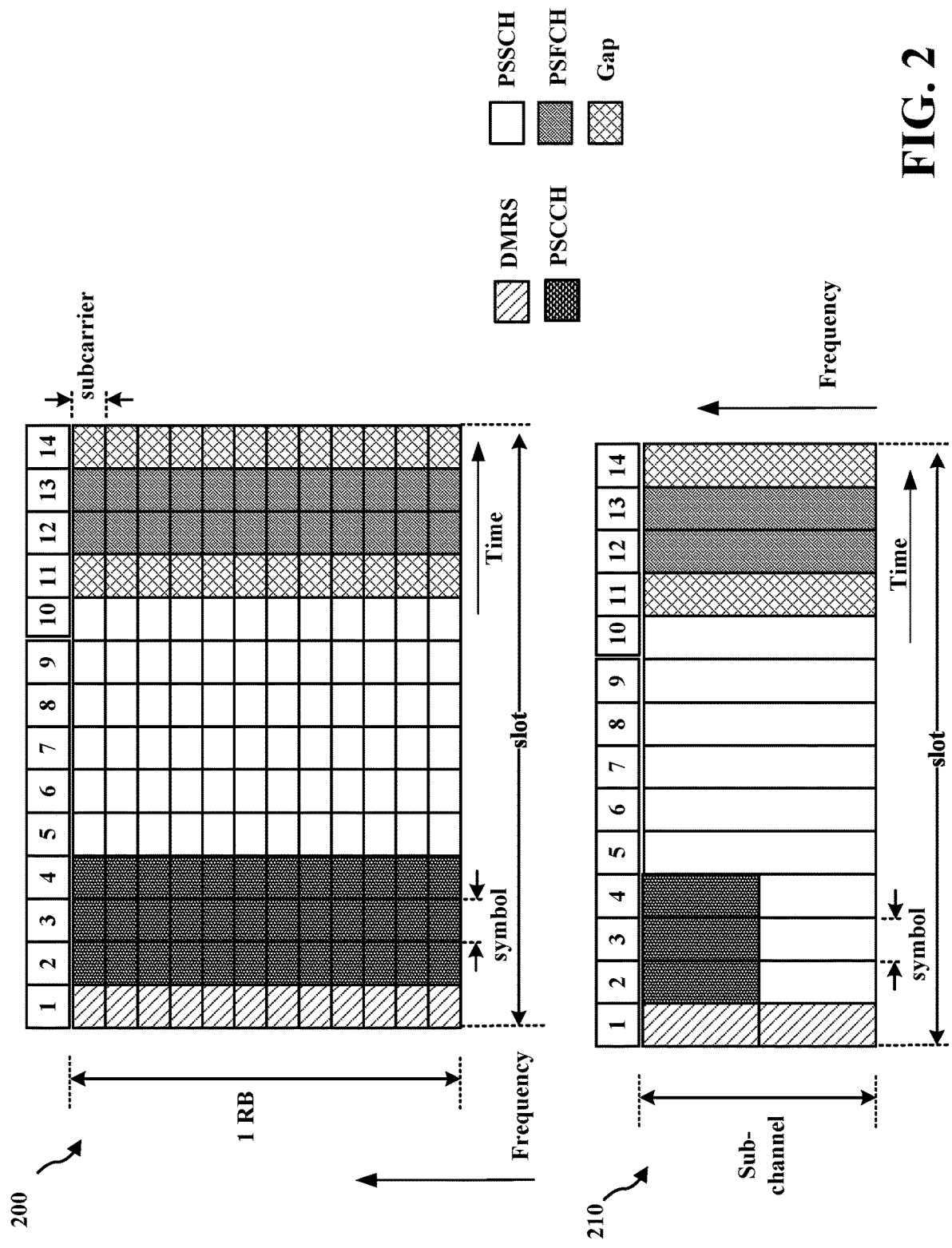
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
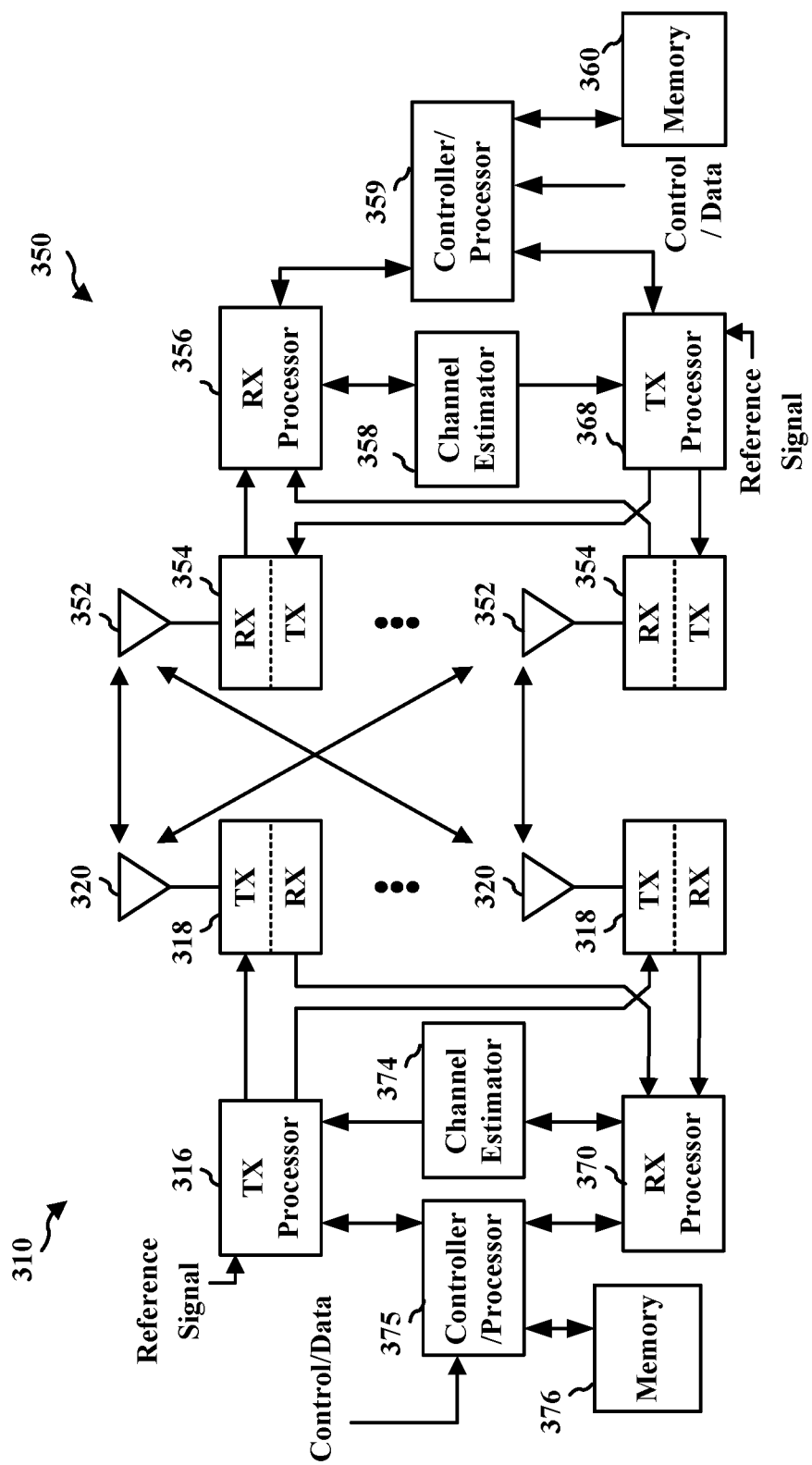
FIG. 3 is a diagram illustrating an example of a base station and user equipment (UE) in an access network.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

At least one of the TX processor 368, the RX processor 356, and the controller/processor 359 may be configured to perform aspects in connection with 199 of FIG. 1.

Figure 4:
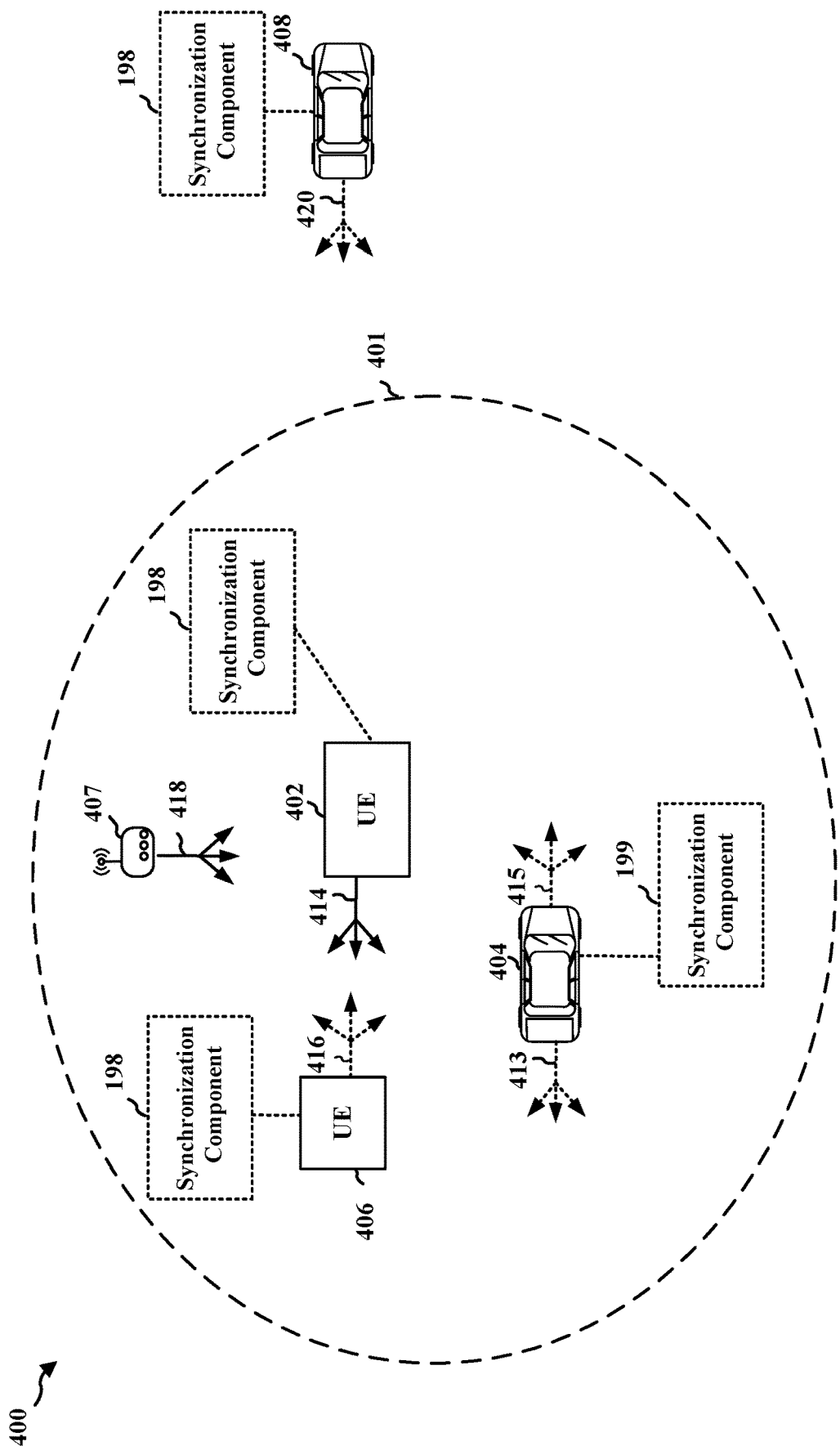
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmissions 416. Additionally/alternatively, RSU 407 may receive communication from and/or transmit communication 418 to UEs 402, 404, 406, 408.

One or more of the UEs 402, 404, 406, 408 or the RSU 407 may comprise a synchronizing component 198 or 199 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
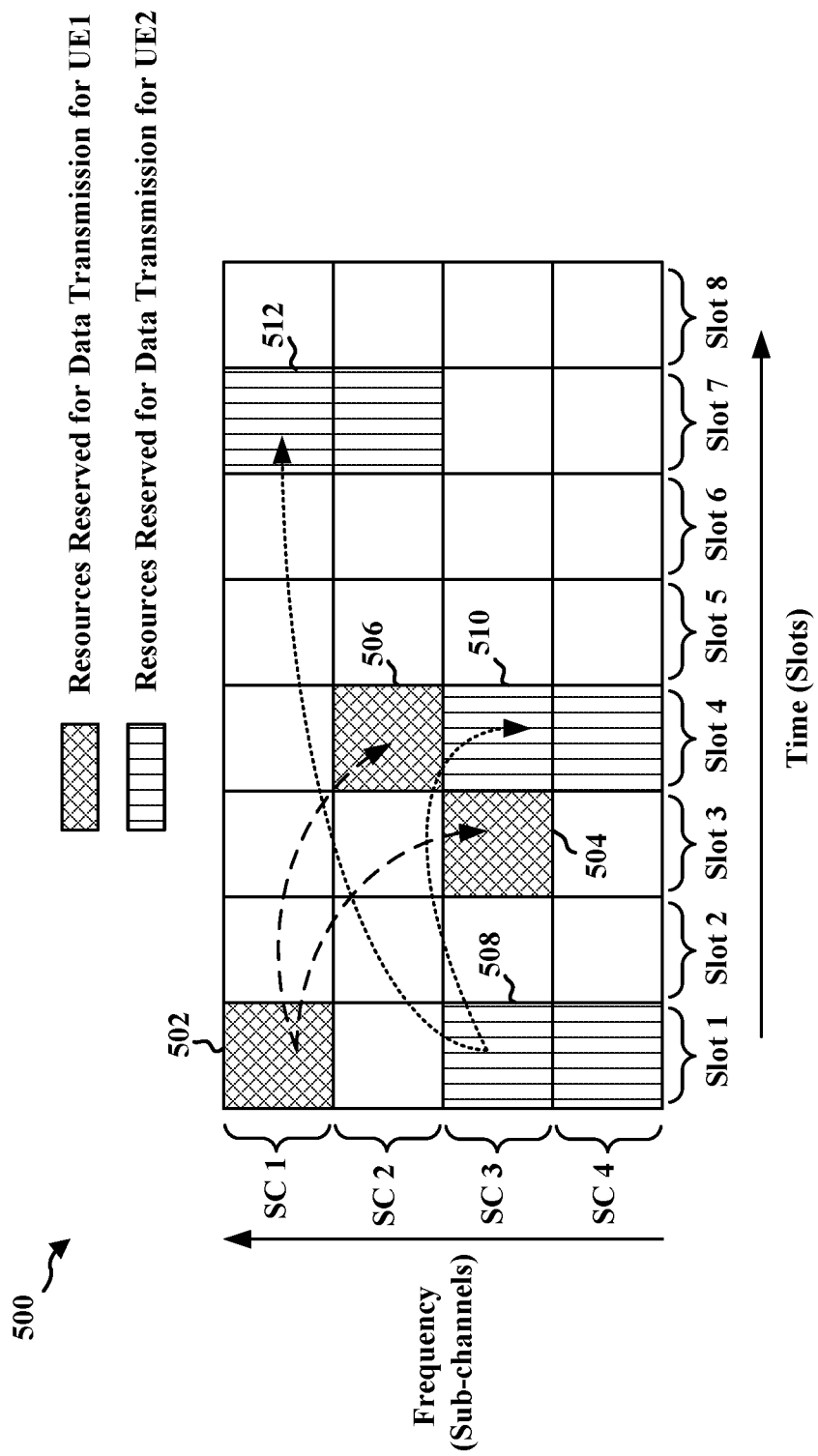
FIG. 5 illustrates examples of resource reservation for sidelink communication.

FIG. 5 is an example 500 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value).

In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508, first data retransmission 510, and second data retransmission 512.

Figure 7:
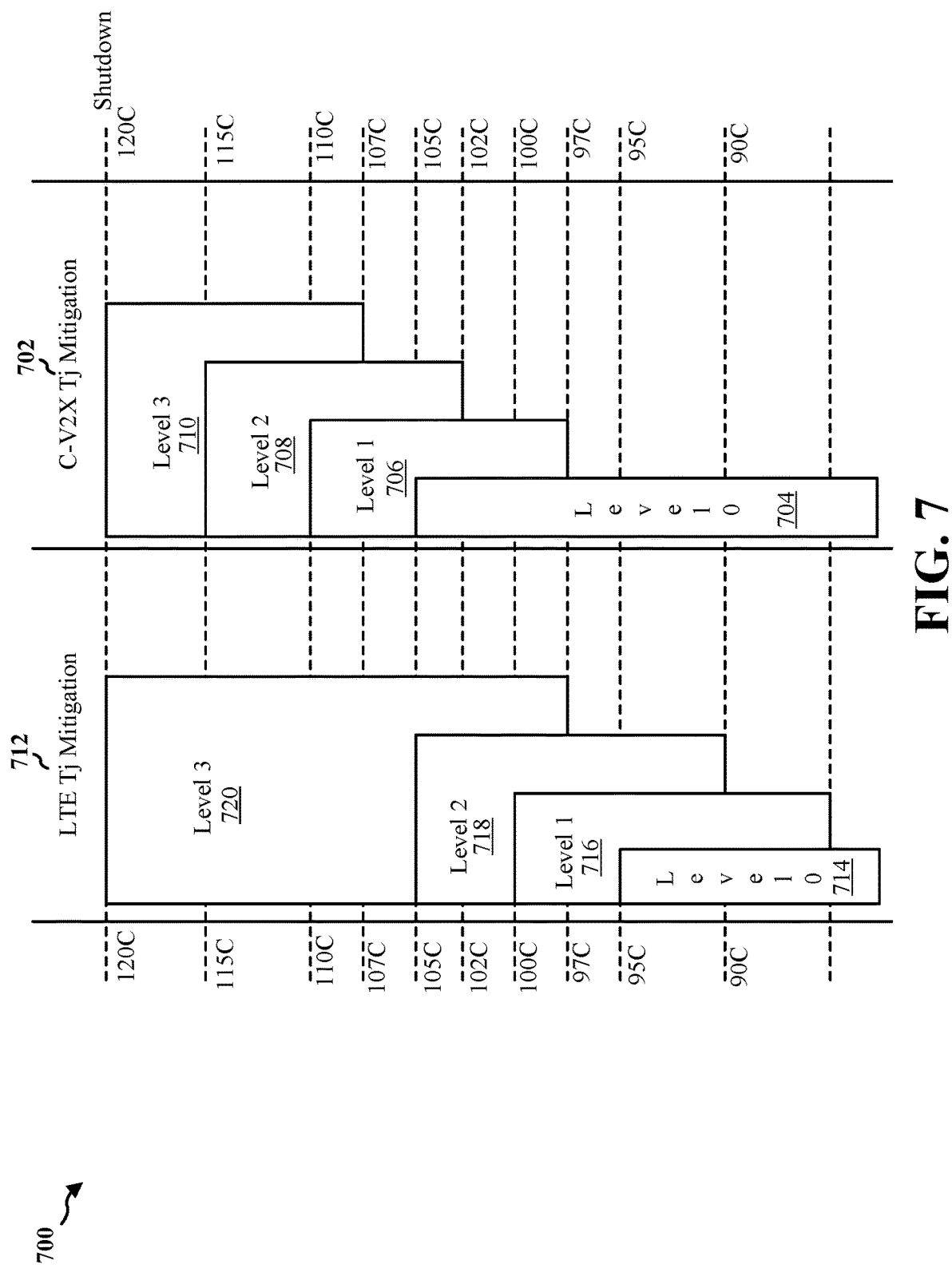
FIG. 7 is a diagram illustrating an example of thermal levels of at least one C-V2X chipset.

In wireless communications, C-V2X communications may be utilized to enable platooning use cases. A platoon of wireless devices may include a plurality of level 2+ (L2+) automated vehicles following each other with a preset time headway where V2V communication provides the means to keep the vehicles together. V2V messages may be exchanged between the vehicles to maintain the platoon. To transmit messages on PC5 interface, each vehicle needs a tight time synchronization. Each vehicle may obtain time independently through a global navigation satellite system (GNSS) system within their respective telematics control unit (TCU). For example, with reference to diagram 600 of FIG. 6, the vehicles 604 may obtain time through the GNSS 602. The vehicles 604 may send V2V messages 606 to maintain the platoon. Operation of the GNSS along with a modem in the TCU may add a thermal and power penalty to the TCU. For example, diagram 700 of FIG. 7 provides an example of thermal levels of at least one C-V2X chipset. The diagram 700 includes examples of LTE thermal level (Tj) mitigation 712 and C-V2X Tj mitigation 702. At higher thermal levels, C-V2X may be disabled. For example, in diagram 700, LTE may operate normally in Level 0 714, while mitigation actions may occur in Level 1 716, Level 2 718, or Level 3 720 in response to increased thermal levels. In diagram 700, C-V2X may be conditionally disabled at Level 2 708 or disabled at Level 3 710. C-V2X operation may occur at Level 0 704, while control channel (CCH) or sidelink channel (SCH) filtering may occur at Level 1 706. Disabling of C-V2X due to thermal constraints may result in the disbanding or the breaking of vehicles from the platoon, which may comprise vehicle safety, especially in level 4 (L4) or level 5 (L5) autonomous vehicles. In some instances, in an optimized chipset, GNSS subsystem may consume approximately 250 mW for multi-frequency GNSS. This power consumption may translate into an additional thermal rise at the chipset. Traditional thermal solutions, such as but not limited to additional coolant, fans, or the like, may increase the bill of materials (BOM), design, size, or the maintenance of the vehicle. Aspects presented herein provide a configuration to maintain C-V2X timing in platoon scenarios. For example, a slave UE within a platoon of UEs may synchronize with a first synchronization source directly or indirectly through a master UE based on the thermal condition of the slave UE. At least one advantage of the disclosure is a reduction of a thermal footprint in the UEs operating within the platoon which may extend the C-V2X operation for an increased or longer duration due to thermal levels not spiking or rising quickly in response to limited operation of the GNSS. At least another advantage of the disclosure is that an increased use or duration of C-V2X operation may result in maintaining the platoon for a longer duration, such that vehicles may remain within the platoon and may not be separated from or cut in and out of the platoon due to C-V2X operation being disabled. Yet another advantage is an increase in safety of vehicles within the platoon due to the enhanced or efficient C-V2X operation.

Figure 8:
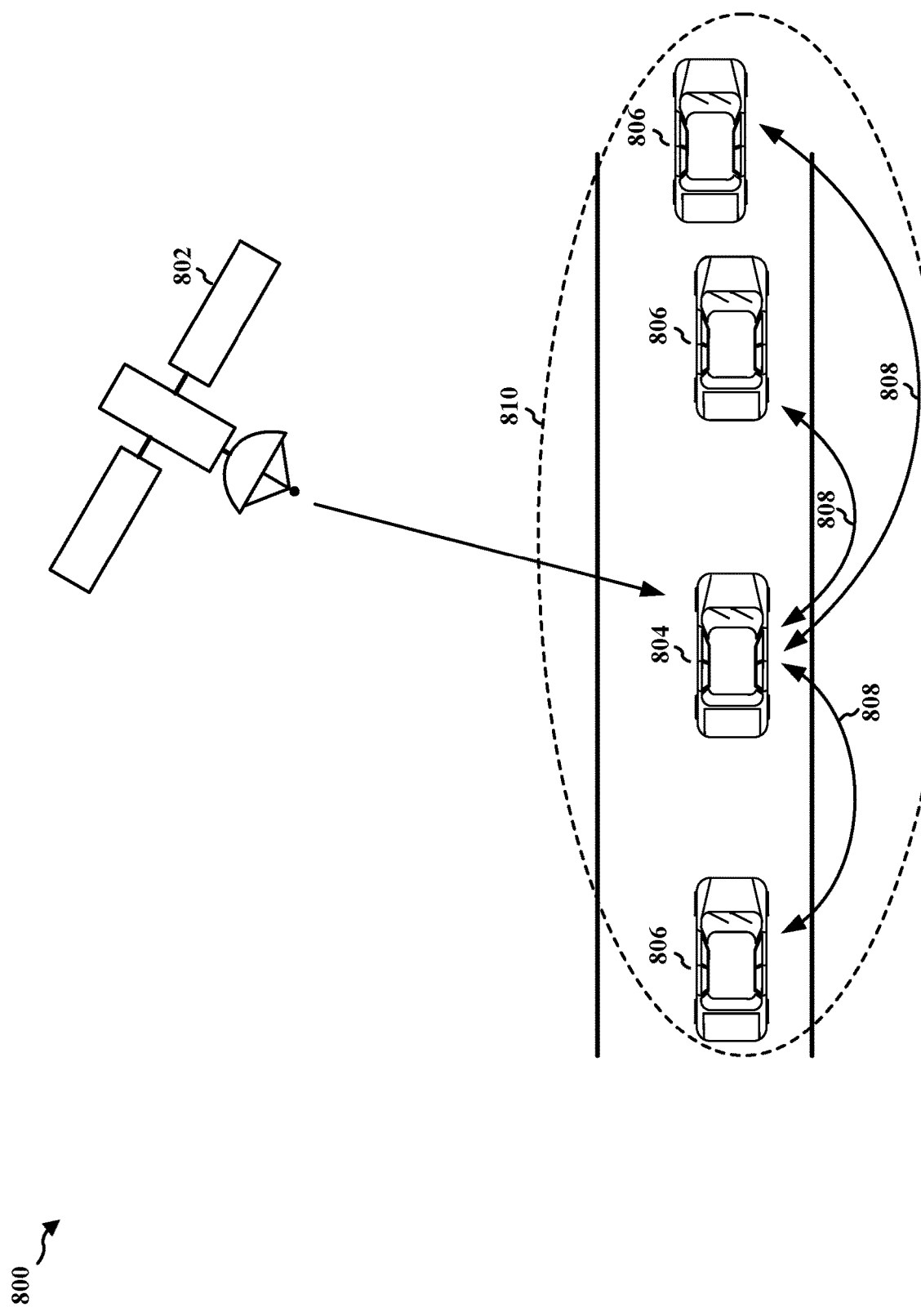
FIG. 8 is a diagram illustrating an example of a C-V2X communication.

FIG. 8 is a diagram 800 of C-V2X communication. The diagram 800 includes a GNSS 602, a master UE 804, and one or more slave UEs 806 in a platoon use case. The master UE 804 and the one or more slave UEs 806 may be within a platoon 810. The master UE 804 may be synchronized with the GNSS 802 and may broadcast sidelink synchronization signals (SLSS) 808 to each of the slave UEs within the platoon to provide each of the slave UEs within the platoon synchronization information with the GNSS. In SLSS, synchronization information may be transmitted by a SyncRef UE (e.g., master UE 804) via sidelink to expand the synchronization coverage of a synchronization source (e.g., GNSS 802) and to enable the nearby UEs (e.g., one or more slave UEs 806) to have the same sidelink timing reference. The master UE 804 may derive timing from GNSS 802 or a base station (e.g, a gNodeB) (not shown). In some instances, synchronization signals may be transmitted at a periodicity of 160 ms. However, in some instances, synchronization signals may be transmitted at different periodicities that may be less than or greater than 160 ms.

In a platoon scenario, every vehicle does not have to independently track the GNSS 802 to maintain C-V2X timing. A master vehicle (e.g., master UE 804) may be chosen in the platoon 810 and the rest of the vehicles (e.g., one or more slave UEs 806) in the platoon 810 may obtain the timing from the synchronization signals broadcasted by the master vehicle (e.g., master UE 804). In some instances, the master vehicle (e.g., master UE 804) may be selected in a round robin configuration. For example, each UE within the platoon may time share the SLSS broadcast in a round robin configuration. In some instances, the master UE 804 may be selected based on the capabilities of the UEs within the platoon. For example, the master UE 804 may be selected based on the UE within the platoon having the best thermal tolerance, battery capacity or range, GNSS availability, or any combinations thereof. The UEs within the platoon may periodically broadcast their capabilities, such that a master UE may be selected based on the updated capabilities broadcasted by the UEs. In some aspects, selection of the master UE 804 may occur at an application level between UEs within the platoon. A new provision may be included to platooning related messages to support this functionality.

In some aspects, for example at thermal level 0, the slave UEs within the platoon do not need to completely turn off the GNSS subsystem. The slave UEs within the platoon may rely on the SLSS from the master UE and maintain a reduced GNSS capability through single frequency 1 Hz, while deactivating features such as, but not limited to, precise positioning engine (PPE), real time kinematics (RTK), precise point positioning (PPP). The reduced GNSS capability may allow slave UEs to reduce CPU processing cycles, which may result in an improved or enhanced thermal efficiency that may allow for an extended or prolonged C-V2X operation. The extended or prolonged C-V2X operation thereby allowing or maintaining the platoon, such that slave UEs do not break from the platoon or cut in and out of the platoon due to C-V2X being disabled.

In some aspects, slave UEs may activate their GNSS subsystem or selected GNSS features periodically based on their thermal condition or sensor feedback to obtain real-time GNSS fixes. Periodic activation of the GNSS subsystem or selected GNSS features may allow slave UEs to check if existing parameters are correct and may adjust accordingly, as needed. In some aspects, such as in instances of UEs having multiple GNSS subsystems (e.g., exclusive GNSS for positioning and GNSS for timing in TCU), such slave UEs may or may not periodically activate GNSS.

Figure 9:
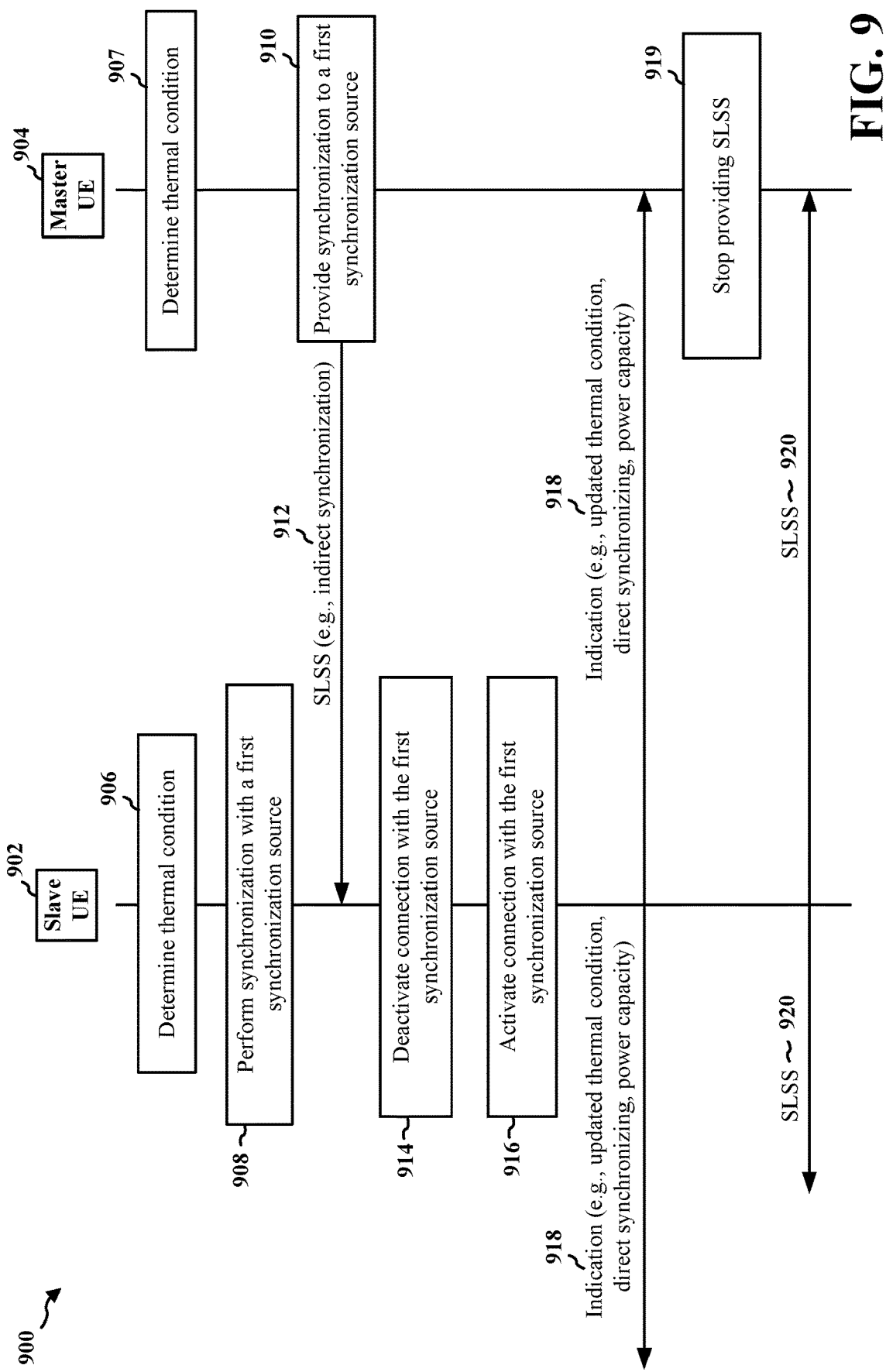
FIG. 9 is a call flow diagram of signaling between a master UE and a slave UE.

FIG. 9 is a call flow diagram 900 of signaling between a slave UE 902 and a master UE 904. The communication may be based on V2X, V2V, or D2D based communication directly from a transmitting device to a receiving device. The communication transmitting between slave UE 902 and master UE 904 may be broadcast and received by multiple receiving devices within range of a particular transmitting device, as described in connection with FIG. 4. The slave UE 902 and/or the master UE 904 may correspond to a C-V2X entity. For example, in the context of FIG. 1, the slave UE 902 may correspond to at least UE 104, and the master UE 904 may correspond to at least 104'. In another example, in the context of FIG. 3, the slave UE 902 may correspond to the device 310, and the master UE 904 may correspond to the device 350.

As illustrated at 906, the slave UE 902 determines a thermal condition of the slave UE 902. The slave UE may be within a platoon of UEs. The platoon of UEs may comprise one or more slave UEs and a master UE. The master UE 904, at 907, determines a thermal condition of the master UE 904.

As illustrated at 908, the slave UE 902 performs synchronization with a first synchronization source, directly or indirectly, based on the thermal condition of the slave UE. In some aspects, the synchronization may be performed directly with the first synchronization source. The synchronization may be performed directly with the first synchronization source in response to a determination that the thermal condition of the slave UE is below a threshold. In some aspects, the synchronization may be performed indirectly with the first synchronization source through the master UE 904. In some aspects, synchronization may be performed directly with the first synchronization source in response to a determination that the thermal condition of the slave UE is below a threshold. In some aspects, the first synchronization source may comprise at least one of a GNSS, a base station, or the like. In some aspects, synchronization may be performed indirectly with the first synchronization source through the master UE in response to a determination that the thermal condition of the slave UE exceeds the threshold. For example, if the determined thermal condition of the slave UE (e.g., high thermal levels) exceeds a threshold, then the slave UE may synchronize with the first synchronization source indirectly through the master UE. The master UE is within the platoon of UEs and is configured to operate as a second synchronization sources that may provide SLSS to the slave UE. The master UE may also provide SLSS to any other slave UE within the platoon of UEs. The slave UE may initially have synchronization directly with the first synchronization source, and once a maser UE within the platoon of UEs is identified or determined, the master UE within the platoon of UEs may start to broadcast SLSS to the one or more slave UEs within the platoon of UEs. In such instances, the slave UE within the platoon of UEs may be able switch to indirect synchronization through the master UE based at least on the thermal condition of the slave UE.

The master UE 904, at 910, may provide synchronization information of a first synchronization source to at least one slave UE (e.g., 902) of the one or more slave UEs within the platoon of UEs based on a determined thermal condition of the master UE. In some aspects, the first synchronization source may comprise at least a GNSS or a base station, or the like.

To provide synchronization to the first synchronization source to at least one slave UE of the one or more slave UEs within the platoon of UEs, the master UE, at 912, may transmit SLSS to the one or more slave UEs to provide the synchronization to the first synchronization source. The slave UE 902 may receive the SLSS from the master UE 904 to synchronize with the first synchronization source. The slave UE 902 receiving the SLSS from the master UE 904 may allow the slave UE to have an indirect synchronization with the first synchronization source via the master UE. The master UE may transmit the SLSS to each slave within the platoon of UEs to provide the synchronization to the first synchronization source. In some aspects, the master UE may operate as a second synchronization source in instances of transmitting the SLSS.

As illustrated at 914, the slave UE 902 may deactivate a direct synchronization connection with the first synchronization source based at least on the thermal condition exceeding a threshold. The slave UE 902 may deactivate the direct synchronization connection with the first synchronization source in response to performing synchronization indirectly with the first synchronization source through the master UE. For example, the slave UE 902 may have a thermal condition (e.g., high thermal level) that exceeds operational thresholds, such that synchronization with the first synchronization source may be negatively impacted or may lead to a loss of connection with the first synchronization source. In such instances, synchronization may be maintained indirectly with the first synchronization source through the master UE.

As illustrated at 916, the slave UE 902 may activate the direct synchronization connection with the first synchronization source. The slave UE may activate the direct synchronization connection with the first synchronization source on a periodic basis. The activation of the direct synchronization connection with the first synchronization source on the periodic basis may occur with reduced capabilities. The slave UE may active the direct synchronization connection with the first synchronization source on the periodic basis with the reduced capabilities in instances where the thermal condition of the slave UE does not exceed the threshold. In some aspects, the direct synchronization connection may be activated to verify or update a second synchronization source through the master UE.

As illustrated at 918, the slave UE 902 may broadcast an indication comprising at least one of an updated thermal condition, availability of directly synchronizing with the first synchronization source, a power capacity, or any combinations thereof. The slave UE may broadcast the indication to each UE (e.g., other slave UEs, master UE 904) within the platoon of UEs. The master UE 904 may receive the broadcast having the indication from the slave UE 902. In some aspects, the indication may indicate that the slave UE may be capable to operate as the master UE based at least on one of the updated thermal condition, the availability of directly synchronizing with the first synchronization source, the power capacity, or any combinations thereof. In some aspects, one of the slave UEs within the platoon of UEs may be selected to be a master UE based at least on one of the updated thermal condition, the availability of directly synchronizing with the first synchronization source, the power capacity, or any combinations thereof.

As illustrated at 919, the master UE 904 may stop broadcasting SLSS to the one or more slave UEs within the platoon of UEs. The master UE may stop broadcasting SLSS to the one or more slave UEs within the platoon of UEs in response to the at least one slave UE switching to operate as the master UE. In some aspects, the master UE may stop operating as the master UE of the platoon of UEs based on the indication indicating that the slave UE may be capable to operate as the master UE. In some aspects, the master UE may operate as a second synchronization source for a period of time. One of the slave UEs within the one or more slave UEs may be selected to be a new second synchronization source (e.g., new master UE) at an end of a period of time and based at least on one of the updated thermal condition, the availability of directly synchronizing with the first synchronization source, the power capacity, or any combinations thereof. At the end of the period of time, the master UE may stop transmitting the SLSS and stop operating as the master UE.

As illustrated at 920, in response to the slave UE 902 switching to operate as the new master UE, the new master UE (e.g., previously operating as the slave UE 902) may broadcast, to the platoon of UEs, SLSS to allow one or more of the slave UEs within the platoon of UEs to indirectly synchronize with the first synchronization source. The new master UE performing synchronization directly with the first synchronization source.

Figure 10:
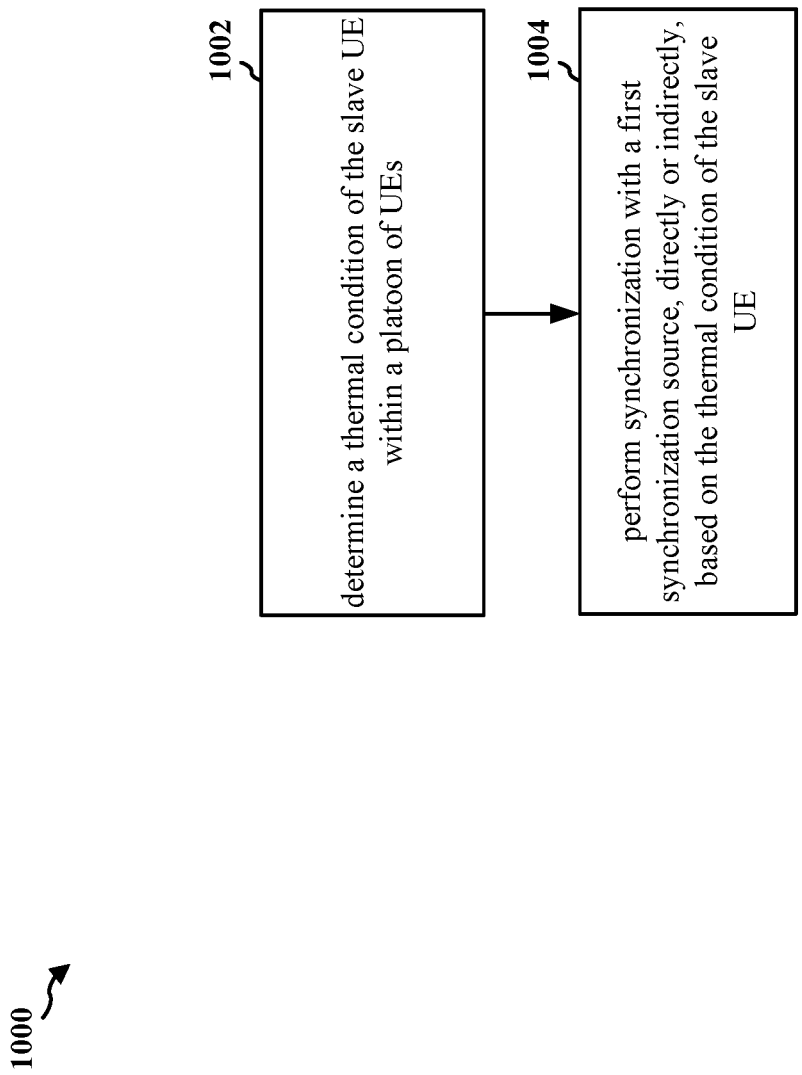
FIG. 10 is a flowchart of a method of wireless communication.

FIG. 10 is a flowchart 1000 of a method of wireless communication. The method may be performed by a slave UE or a component of a slave UE (e.g., the UE 104; the apparatus 1202; the baseband processor 1204, which may include the memory 360 and which may be the entire device 310 or a component of the device 310, such as the TX processor 316, the RX processor 370, and/or the controller/processor 375). One or more of the illustrated operations may be omitted, transposed, or contemporaneous. The method may allow a slave UE to synchronize with a first synchronization source, directly or indirectly, based on a thermal condition of the slave UE.

At 1002, the slave UE determines a thermal condition of the slave UE. For example, 1002 may be performed by thermal component 1240 of apparatus 1202. The slave UE may be within a platoon of UEs. The platoon of UEs may comprise a master UE and one or more slave UEs.

At 1004, the slave UE performs synchronization with a first synchronization source. For example, 1004 may be performed by synchronization component 1242 of apparatus 1202. The slave UE performs synchronization with the first synchronization source, directly or indirectly, based on the thermal condition of the slave UE. In some aspects, the synchronization may be performed directly with the first synchronization source. The synchronization may be performed directly with the first synchronization source in response to a determination that the thermal condition of the slave UE is below a threshold. In some aspects, the synchronization may be performed indirectly with the first synchronization source through a master UE. In some aspects, synchronization may be performed directly with the first synchronization source in response to a determination that the thermal condition of the slave UE is below a threshold. In some aspects, the first synchronization source may comprise at least one of a GNSS or a base station, or the like. In some aspects, synchronization may be performed indirectly with the first synchronization source through the master UE in response to a determination that the thermal condition of the slave UE exceeds the threshold. The master UE is within the platoon of UEs and is configured to operate as a second synchronization sources that may provide SLSS to the slave UE. The master UE may also provide SLSS to any other slave UE within the platoon of UEs. The slave UE may initially have synchronization directly with the first synchronization source, and once a maser UE within the platoon of UEs is identified or determined, the master UE within the platoon of UEs may start to broadcast SLSS to the one or more slave UEs within the platoon of UEs. In such instances, the slave UE within the platoon of UEs may be able switch to indirect synchronization through the master UE based at least on the thermal condition of the slave UE.

Figure 11:
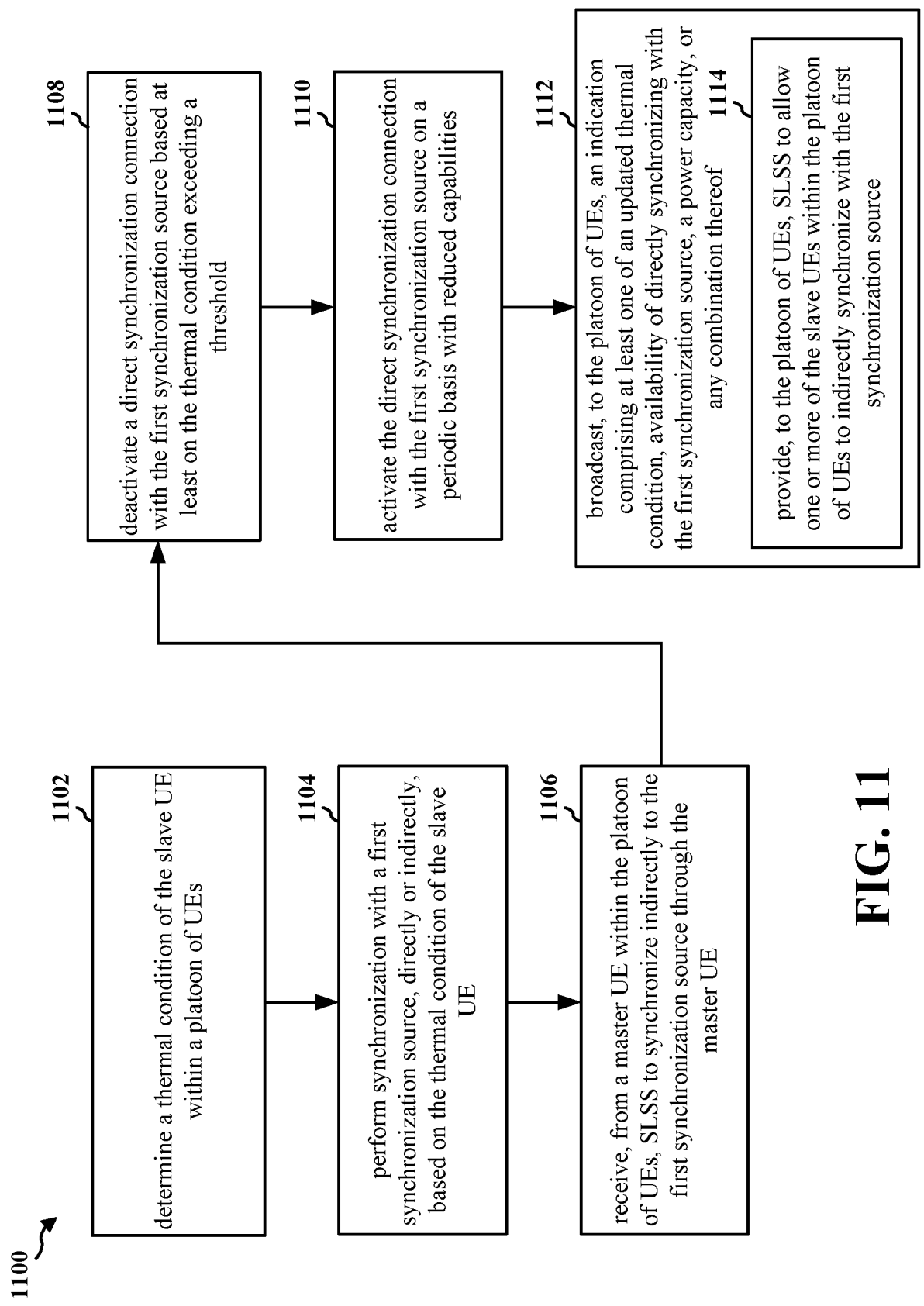
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the baseband processor 1204, which may include the memory 360 and which may be the entire device 310 or a component of the device 310, such as the TX processor 316, the RX processor 370, and/or the controller/processor 375). One or more of the illustrated operations may be omitted, transposed, or contemporaneous. The method may allow a slave UE to synchronize with a first synchronization source, directly or indirectly, based on a thermal condition of the slave UE.

At 1102, the slave UE determines a thermal condition of the slave UE. For example, 1102 may be performed by thermal component 1240 of apparatus 1202. The slave UE may be within a platoon of UEs. The platoon of UEs may comprise a master UE and one or more slave UEs.

At 1104, the slave UE performs synchronization with a first synchronization source. For example, 1104 may be performed by synchronization component 1242 of apparatus 1202. The slave UE performs synchronization with the first synchronization source, directly or indirectly, based on the thermal condition of the slave UE. In some aspects, the synchronization may be performed directly with the first synchronization source. The synchronization may be performed directly with the first synchronization source in response to a determination that the thermal condition of the slave UE is below a threshold. In some aspects, the synchronization may be performed indirectly with the first synchronization source through a master UE. In some aspects, synchronization may be performed directly with the first synchronization source in response to a determination that the thermal condition of the slave UE is below a threshold. In some aspects, the first synchronization source may comprise at least one of a GNSS or a base station, or the like. In some aspects, synchronization may be performed indirectly with the first synchronization source through the master UE in response to a determination that the thermal condition of the slave UE exceeds the threshold. The master UE is within the platoon of UEs and is configured to operate as a second synchronization sources that may provide SLSS to the slave UE. The master UE may also provide SLSS to any other slave UE within the platoon of UEs. The slave UE may initially have synchronization directly with the first synchronization source, and once a maser UE within the platoon of UEs is identified or determined, the master UE within the platoon of UEs may start to broadcast SLSS to the one or more slave UEs within the platoon of UEs. In such instances, the slave UE within the platoon of UEs may be able switch to indirect synchronization through the master UE based at least on the thermal condition of the slave UE.

At 1106, the slave UE may receive SLSS. For example, 1106 may be performed by synchronization component 1242 of apparatus 1202. The slave UE may receive the SLSS from the master UE. The master UE being within the platoon of UEs. The slave UE may receive the SLSS from the master UE to synchronize indirectly to the first synchronization source through the master UE. In some aspects, the master UE may operate as a second synchronization source. The slave UE may operate with reduced capabilities of the first synchronization source in instances of indirect synchronization with the first synchronization source through the master UE. For example, the slave UE that has a thermal condition that exceeds a threshold may switch to indirect synchronization through the master UE which may allow the slave UE to deactivate features (e.g., PPE, RTK, PPP) that may be utilized when the slave UE has synchronization directly with the first synchronization source. In some aspects, the slave UE may have a thermal condition that does not exceed the threshold, but may switch to indirect synchronization through the master UE which may allow the slave UE to deactivate features (e.g., PPE, RTK, PPP). In some aspects, the slave UE may switch to indirect synchronization through the master in response to detecting an increase in the thermal condition that may result in exceeding the threshold in the near future. The deactivation of some features (e.g., PPE, RTK, PPP) allows the slave UE to operate with reduced capabilities of the first synchronization source. The deactivation of such features allows the slave UE to reduce processing resources which may improve the thermal efficiency of the slave UE.

At 1108, the slave UE may deactivate a direct synchronization connection with the first synchronization source. For example, 1108 may be performed by connection component 1244 of apparatus 1202. The slave UE may deactivate the direct connection with the first synchronization source based at least on the thermal condition exceeding a threshold. In such instances, synchronization may be maintained indirectly with the first synchronization source through the master UE.

At 1110, the slave UE may activate the direct synchronization connection with the first synchronization source. For example, 1110 may be performed by connection component 1244 of apparatus 1202. The slave UE may activate the direct synchronization connection with the first synchronization source on a periodic basis with reduced capabilities. The direct synchronization connection may be activated to verify or update a second synchronization source through the master UE.

At 1112, the slave UE may broadcast an indication comprising at least one of an updated thermal condition, availability of directly synchronizing with the first synchronization source, a power capacity, or any combinations thereof. For example, 1112 may be performed by broadcast component 1246 of apparatus 1202. The slave UE may broadcast the indication to the platoon of UEs. In some aspects, the indication may indicate that the slave UE may be capable to operate as the master UE based at least on one of the updated thermal condition, the availability of directly synchronizing with the first synchronization source, the power capacity, or any combinations thereof. For example, at 1114, in response to the slave UE switching to operate as the new master UE, the new master UE (e.g., previously operating as a slave UE) may broadcast, to the platoon of UEs, SLSS to allow one or more of the slave UEs within the platoon of UEs to indirectly synchronize with the first synchronization source. For example, 1114 may be performed by broadcast component 1246 of apparatus 1202.

Figure 12:
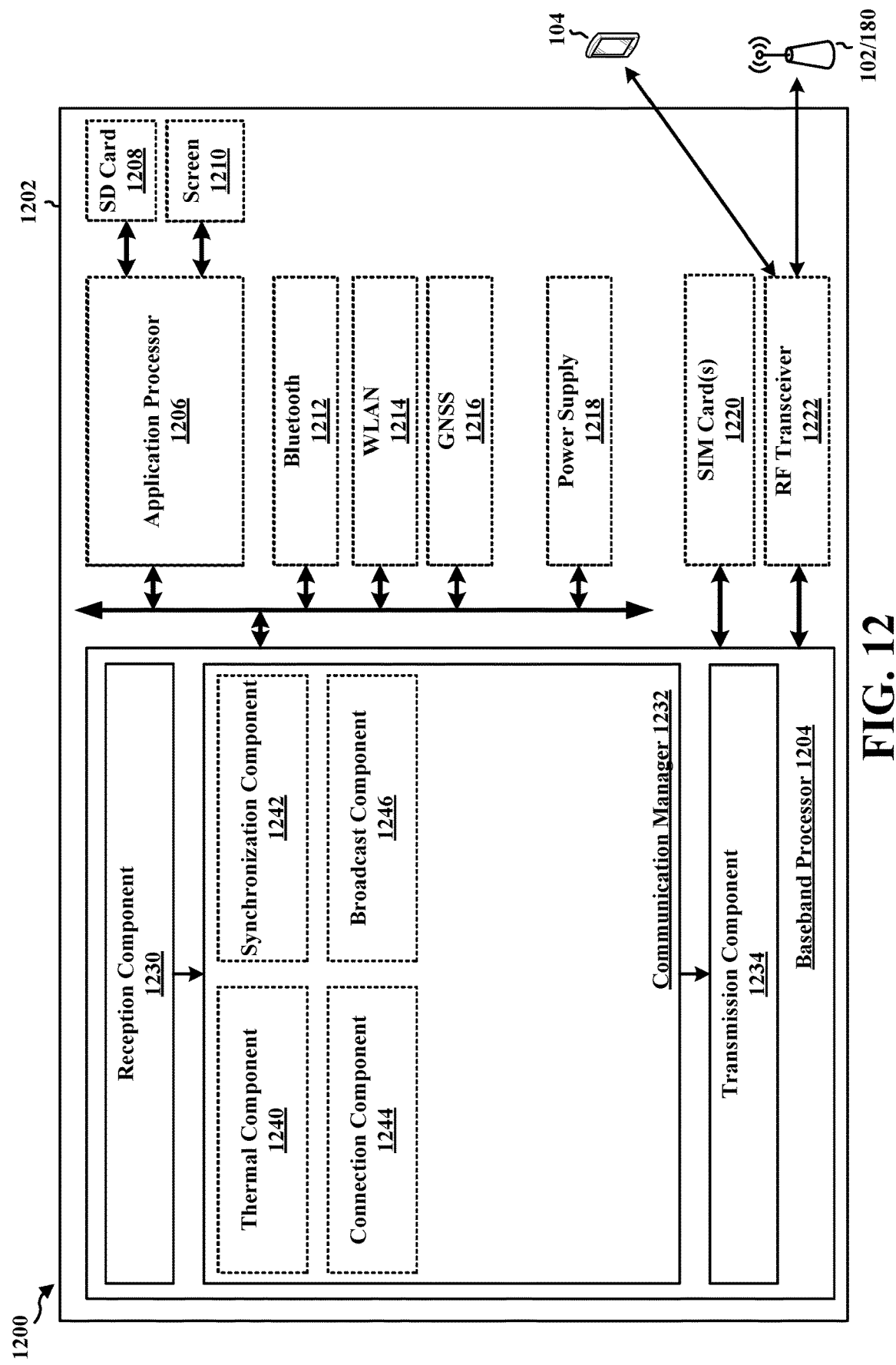
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a baseband processor 1204 (also referred to as a modem) coupled to a RF transceiver 1222. In some aspects, the baseband processor 1204 may be a cellular baseband processor and/or the RF transceiver 1222 may be a cellular RF transceiver. The apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a GNSS module 1216, or a power supply 1218. The GNSS module 1516 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described supra. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the device 310 and may include the memory 376 and/or at least one of the TX processor 316, the RX processor 370, and the controller/processor 375. In one configuration, the apparatus 1202 may be a modem chip and include just the baseband processor 1204, and in another configuration, the apparatus 1202 may be the entire UE (e.g., see 310 of FIG. 3) and include the additional modules of the apparatus 1202.

The communication manager 1232 includes a thermal component 1240 that is configured to determine a thermal condition of the slave UE, e.g., as described in connection with 1002 of FIG. 10 or 1102 of FIG. 11. The communication manager 1232 further includes a synchronization component 1242 that is configured to perform synchronization with a first synchronization source, e.g., as described in connection with 1004 of FIG. 10 or 1104 of FIG. 11. The synchronization component 1242 may be further configured to receive SLSS, e.g., as described in connection with 1106 of FIG. 11. The communication manager 1232 further includes a connection component 1244 that is configured to deactivate a direct synchronization connection with the first synchronization source, e.g., as described in connection with 1108 of FIG. 11. The connection component 1244 may be further configured to activate the direct synchronization connection with the first synchronization source, e.g., as described in connection with 1110 of FIG. 11. The communication manager 1232 further includes a broadcast component 1246 that is configured to broadcast an indication comprising at least one of an updated thermal condition, availability of directly synchronizing with the first synchronization source, a power capacity, or any combination thereof e.g., as described in connection with 1112 of FIG. 11. The broadcast component 1246 may be further configured to broadcast, to the platoon of UEs, SLSS to allow one or more slave UEs within the platoon of UEs to indirectly synchronize with the first synchronization source.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
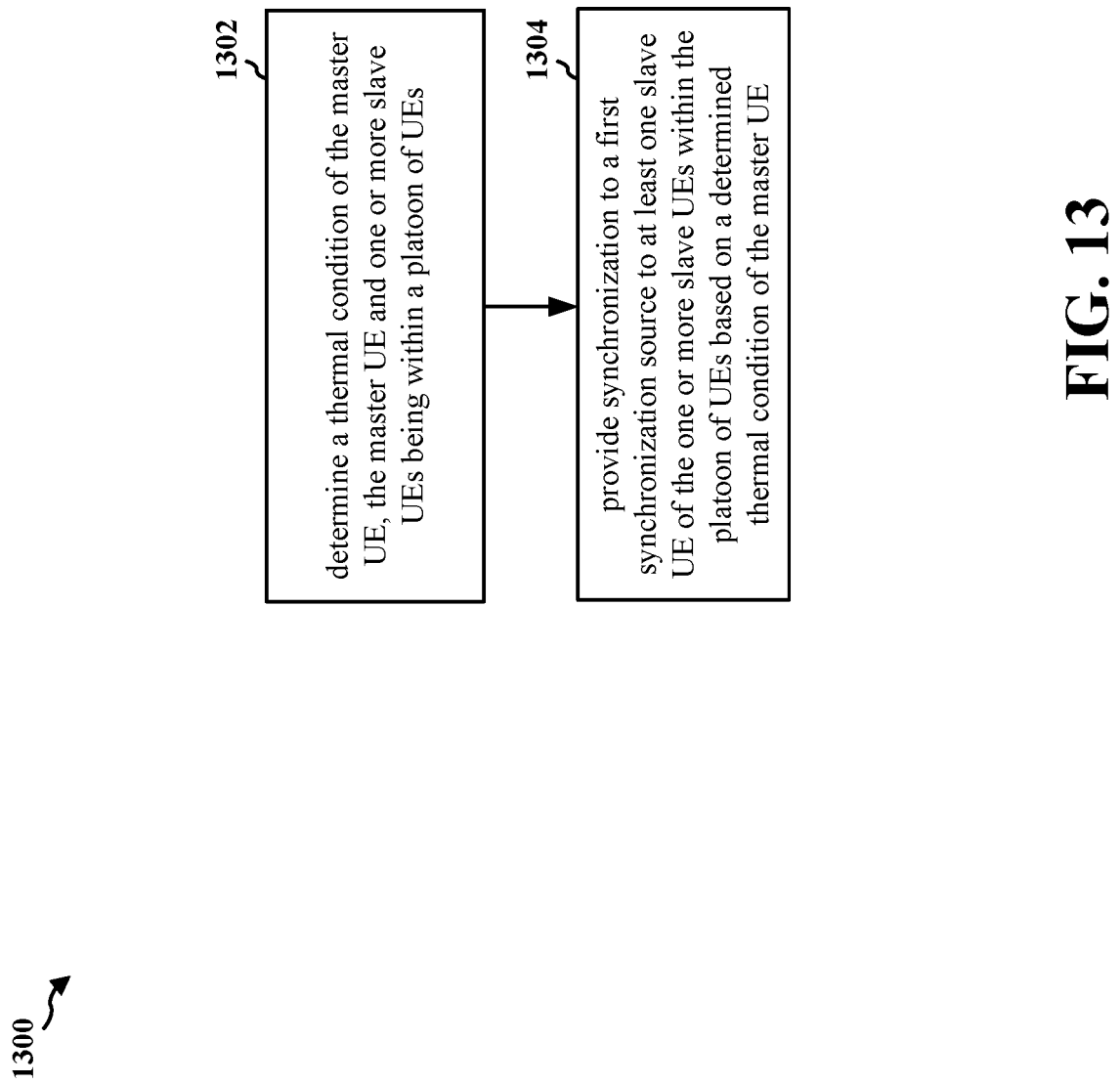
FIG. 13 is a flowchart of a method of wireless communication.

As shown, the apparatus 1202 may include a variety of components configured for various functions. In one configuration, the apparatus 1202, and in particular the baseband processor 1204, includes means for determining a thermal condition of the slave UE within a platoon of UEs. The apparatus includes means for performing synchronization with a first synchronization source, directly or indirectly, based on the thermal condition of the slave UE. The apparatus may further include means for receiving, from a master UE within the platoon of UEs, SLSS to synchronize indirectly to the first synchronization source through the master UE. The apparatus may further include means for deactivating a direct synchronization connection with the first synchronization source based at least on the thermal condition exceeding a threshold. Synchronization is maintained indirectly with the first synchronization source through a master UE. The apparatus may further include means for activating the direct synchronization connection with the first synchronization source on a periodic basis with reduced capabilities. The direct synchronization connection is activated to verify or update a second synchronization source through the master UE. The apparatus may further include means for broadcasting, to the platoon of UEs, an indication comprising at least one of an updated thermal condition, availability of directly synchronizing with the first synchronization source, a power capacity, or any combinations thereof. The apparatus may further include means for providing, to the platoon of UEs, SLSS to allow one or more of the slave UEs within the platoon of UEs to indirectly synchronize with the first synchronization source, in response to the slave UE switching to operate as the master UE. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means. FIG. 13 is a flowchart 1300 of a method of wireless communication. The method may be performed by a UE or a component of a UE (e.g., the UE 104; the apparatus 1502; the baseband processor 1504, which may include the memory 360 and which may be the entire device 350 or a component of the device 350, such as the TX processor 368, the RX processor 356, and/or the controller/processor 359). One or more of the illustrated operations may be omitted, transposed, or contemporaneous. The method may allow a master UE to provide synchronization to a synchronization source to one or more slave UEs based on a thermal condition of the master UE.

At 1302, the master UE determines a thermal condition of the master UE. For example, 1302 may be performed by thermal component 1540 of apparatus 1502. The master UE and one or more slave UEs may be within a platoon of UEs.

At 1304, the master UE provides synchronization to a first synchronization source to at least one slave UE of the one or more slave UEs within the platoon of UEs. For example, 1304 may be performed by synchronization component 1542 of apparatus 1502. The master UE provides synchronization to the first synchronization source to at least one slave UE of the one or more slave UEs within the platoon of UEs based on a determined thermal condition of the master UE. In some aspects, the first synchronization source may comprise at least a GNSS or a base station.

Figure 14:
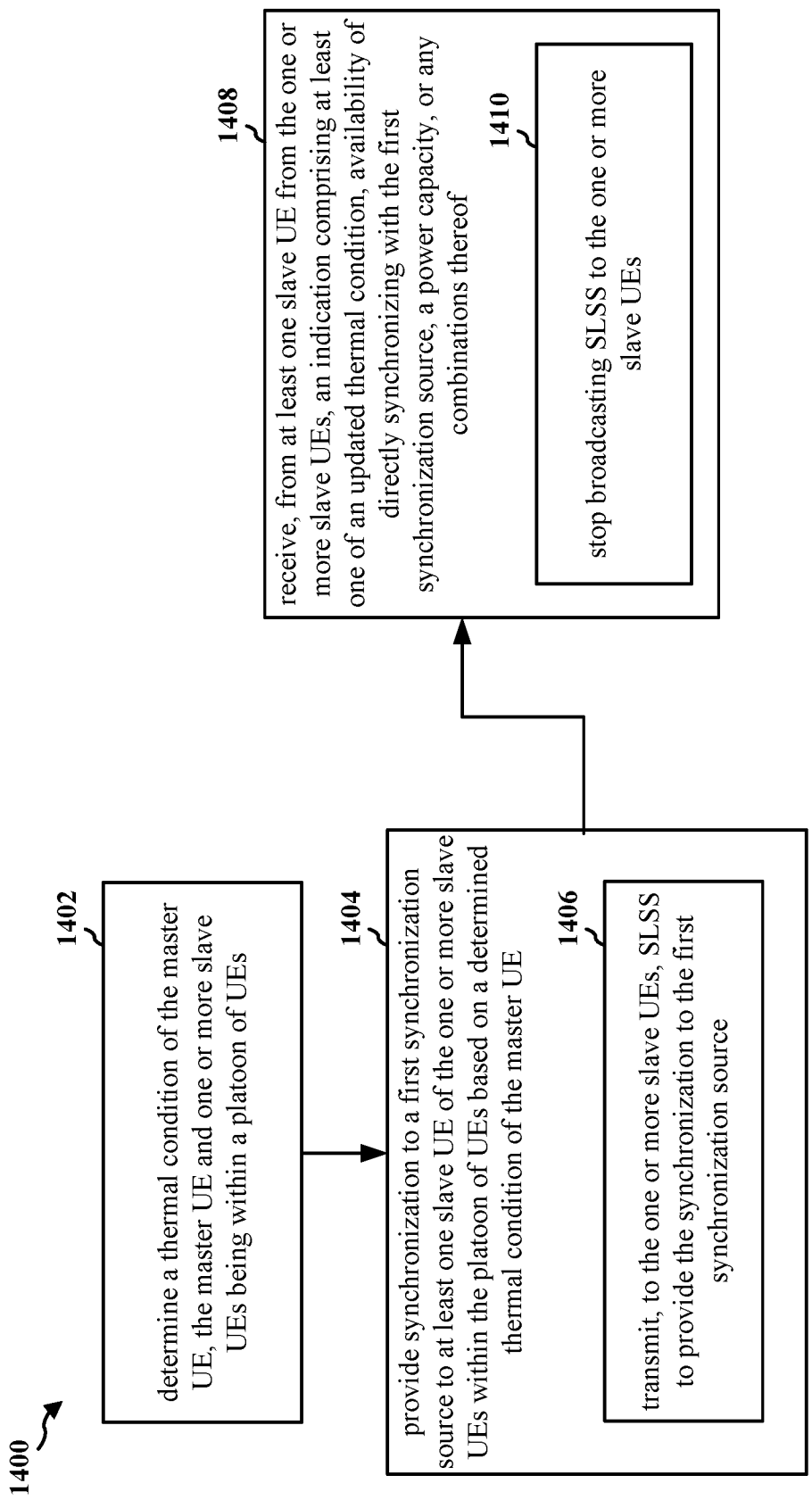
FIG. 14 is a flowchart of a method of wireless communication.

FIG. 14 is a flowchart 1400 of a method of wireless communication. The method may be performed by a UE or a component of a UE (e.g., the UE 104; the apparatus 1502; the baseband processor 1504, which may include the memory 360 and which may be the entire device 350 or a component of the device 350, such as the TX processor 368, the RX processor 356, and/or the controller/processor 359). One or more of the illustrated operations may be omitted, transposed, or contemporaneous. The method may allow a master UE to provide synchronization to a synchronization source to one or more slave UEs based on a thermal condition of the master UE.

At 1402, the master UE determines a thermal condition of the master UE. For example, 1402 may be performed by thermal component 1540 of apparatus 1502. The master UE and one or more slave UEs may be within a platoon of UEs.

At 1404, the master UE provides synchronization to a first synchronization source to at least one slave UE of the one or more slave UEs within the platoon of UEs. For example, 1404 may be performed by synchronization component 1542 of apparatus 1502. The master UE provides synchronization to the first synchronization source to at least one slave UE of the one or more slave UEs within the platoon of UEs based on a determined thermal condition of the master UE. In some aspects, the first synchronization source may comprise at least a GNSS or a base station.

At 1406, to provide synchronization to the first synchronization source to at least one slave UE of the one or more slave UEs within the platoon of UEs, the master UE may transmit SLSS. For example, 1406 may be performed by synchronization component 1542 of apparatus 1502. The master UE may transmit SLSS to the one or more slave UEs to provide the synchronization to the first synchronization source. In some aspects, the master UE may operate as a second synchronization source. The at least one slave UE may operate with reduced capabilities of the first synchronization source in instances of indirect synchronization with the first synchronization source through the master UE.

At 1408, the master UE may receive an indication comprising at least one of an updated thermal condition, availability of directly synchronizing with the first synchronization source, a power capacity, or any combinations thereof. For example, 1408 may be performed by indication component 1544 of apparatus 1502. The master UE may receive the indication from at least one slave UE from the one or more slave UEs within the platoon of UEs. In some aspects, the indication may indicate that the at least one slave UE from the one or more slave UEs may be capable to operate as a new master UE based at least on one of the updated thermal condition, the availability of directly synchronizing with the first synchronization source, the power capacity, or any combinations thereof. In some aspects, the master UE may operate as a second synchronization source for a period of time. One of the slave UEs within the one or more slave UEs may be selected to be a new second synchronization source (e.g., new master UE) at an end of a period of time and based at least on one of the updated thermal condition, the availability of directly synchronizing with the first synchronization source, the power capacity, or any combinations thereof. In some instances, for example, at 1410, the master UE may stop broadcasting SLSS to the one or more slave UEs. For example, 1410 may be performed by synchronization component 1542 of apparatus 1502. The master UE may stop broadcasting SLSS to the one or more slave UEs in response to the at least one slave UE switching to operate as the master UE.

Figure 15:
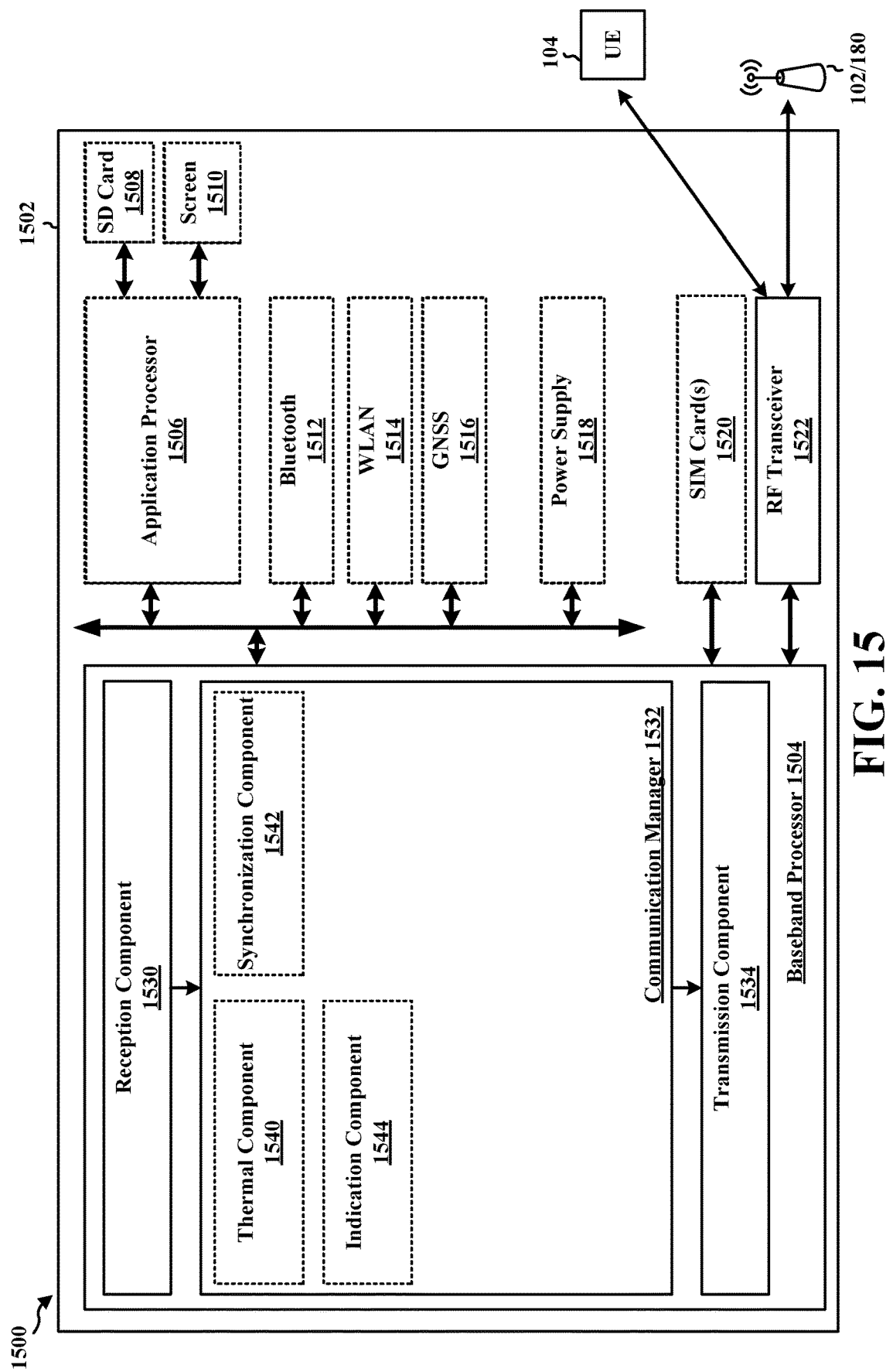
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a GNSS module 1516, or a power supply 1518. The GNSS module 1516 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a thermal component 1540 that is configured to determine a thermal condition of the master UE, e.g., as described in connection with 1302 of FIG. 13 or 1402 of FIG. 14. The communication manager 1532 further includes a synchronization component 1542 that is configured to provide synchronization to a first synchronization source to at least one slave UE of one or more slave UEs within a platoon of UEs, e.g., as described in connection with 1304 of FIG. 13 or 1404 of FIG. 14. The synchronization component 1542 may be further configured to transmit SLSS to provide the synchronization to the first synchronization source, e.g., as described in connection with 1406 of FIG. 14. The synchronization component 1542 may be further configured to stop broadcasting SLSS to the one or more slave UEs, e.g., as described in connection with 1410 of FIG. 14. The communication manager 1532 further includes an indication component 1544 that is configured to receive an indication comprising at least one of an updated thermal condition, availability of directly synchronizing with the first synchronization source, a power capacity, or any combination thereof, e.g., as described in connection with 1408 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for determining a thermal condition of the master UE. The master UE and one or more slave UEs being within a platoon of UEs. The apparatus includes means for providing synchronization to a first synchronization source to at least one slave UE of the one or more slave UEs within the platoon of UEs based on a determined thermal condition of the master UE. The apparatus further includes means for transmitting, to the one or more slave UEs, SLSS to provide the synchronization to the first synchronization source. The apparatus further includes means for receiving, from at least one slave UE from the one or more slave UEs, an indication comprising at least one of an updated thermal condition, availability of directly synchronizing with the first synchronization source, a power capacity, or any combinations thereof. The apparatus further includes means for stopping broadcasting SLSS to the one or more slave UEs, in response to the at least one slave UE switching to operate as the master UE. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means. It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a slave UE including at least one processor coupled to a memory and a transceiver and configured to determine a thermal condition of the slave UE within a platoon of UEs; and perform synchronization with a first synchronization source, directly or indirectly, based on the thermal condition of the slave UE.

Aspect 2 is the apparatus of aspect 1, further includes that the at least one processor is further configured to receive, from a master UE with the platoon of UEs, SLSS to synchronize indirectly to the first synchronization source through the master UE.

Aspect 3 is the apparatus of any of aspects 1 and 2, further includes that the master UE operates as a second synchronization source.

Aspect 4 is the apparatus of any of aspects 1-3, further includes that the first synchronization source comprises at least a GNSS or a base station.

Aspect 5 is the apparatus of any of aspects 1-4, further includes that the at least one processor is further configured to deactivate a direct synchronization connection with the first synchronization source based at least on the thermal condition exceeding a threshold, wherein the synchronization is maintained indirectly with the first synchronization source through the master UE.

Aspect 6 is the apparatus of any of aspects 1-5, further includes that the at least one processor is further configured to activate the direct synchronization connection with the first synchronization source on a periodic basis with reduced capabilities, wherein the direct synchronization connection is activated to verify or update a second synchronization source through the master UE.

Aspect 7 is the apparatus of any of aspects 1-6, further includes that the at least one processor is further configured to broadcast, to the platoon of UEs, an indication comprising at least one of an updated thermal condition, availability of directly synchronizing with the first synchronization source, a power capacity, or any combination thereof.

Aspect 8 is the apparatus of any of aspects 1-7, further includes that the indication indicates that the slave UE is capable to operate as a master UE based at least on one of the updated thermal condition, the availability of directly synchronizing with the first synchronization source, the power capacity, or any combinations thereof.

Aspect 9 is the apparatus of any of aspects 1-8, further includes that in response to the slave UE switching to operate as the master UE, the at least one processor is further configured to provide, to the platoon of UEs, SLSS to allow one or more of the slave UEs within the platoon of UEs to indirectly synchronize with the first synchronization source.

Aspect 10 is the apparatus of any of aspects 1-9, further includes that the synchronization is performed directly with the first synchronization source in response to a determination that the thermal condition of the slave UE is below a threshold.

Aspect 11 is the apparatus of any of aspects 1-10, further includes that the synchronization is performed indirectly with the first synchronization source through a master UE within the platoon of UE in response to a determination that the thermal condition exceeds a threshold.

Aspect 12 is a method of wireless communication for implementing any of aspects 1-11.

Aspect 13 is an apparatus for wireless communication including means for implementing any of aspects 1-11.

Aspect 14 is a computer-readable medium storing computer executable code, where the code when executed by a processor causes the processor to implement any of aspects 1-11.

Aspect 15 is an apparatus for wireless communication at a master UE including at least one processor coupled to a memory and a transceiver and configured to determine a thermal condition of the master UE, the master UE and one or more slave UEs being within a platoon of UEs; and provide synchronization to a first synchronization source to at least one slave UE of the one or more slave UEs within the platoon of UEs based on a determined thermal condition of the master UE.

Aspect 16 is the apparatus of aspect 15, further includes that to provide the synchronization to the first synchronization source to the at least one slave UE of the one or more slave UEs within the platoon of UEs, the at least one processor is further configured to transmit, to the one or more slave UEs, SLSS to provide the synchronization to the first synchronization source.

Aspect 17 is the apparatus of any of aspects 15 and 16, further includes that the master UE operates as a second synchronization source.

Aspect 18 is the apparatus of any of aspects 15-17, further includes that the first synchronization source comprises at least a GNSS or a base station.

Aspect 19 is the apparatus of any of aspects 15-18, further includes that the at least one processor is further configured to receive, from the at least one slave UE from the one or more slave UEs, an indication comprising at least one of an updated thermal condition, availability of directly synchronizing with the first synchronization source, a power capacity, or any combinations thereof.

Aspect 20 is the apparatus of any of aspects 15-19, further includes that the indication indicates that the at least one slave UE from the one or more slave UEs is capable to operate as the master UE based at least on one of the updated thermal condition, the availability of directly synchronizing with the first synchronization source, the power capacity, or any combinations thereof.

Aspect 21 is the apparatus of any of aspects 15-20, further includes that in response to the at least one slave UE switching to operate as the master UE, the at least one processor is further configured to stop broadcasting SLSS to the one or more slave UEs.

Aspect 22 is the apparatus of any of aspects 15-21, further includes that the master UE operates as a second synchronization source for a period of time, wherein one of the slave UEs within the one or more slave UEs is selected to be the master UE at an end of the period of time and based at least on one of the updated thermal condition, the availability of directly synchronizing with the first synchronization source, the power capacity, or any combinations thereof.

Aspect 23 is a method of wireless communication for implementing any of aspects 15-22.

Aspect 24 is an apparatus for wireless communication including means for implementing any of aspects 15-22.

Aspect 25 is a computer-readable medium storing computer executable code, where the code when executed by a processor causes the processor to implement any of aspects 15-22.

What is claimed is:

1. An apparatus for wireless communication at a slave user equipment (UE), comprising:
   memory;
   at least one transceiver; and
   at least one processor, communicatively coupled to the memory and the at least one transceiver, the at least one processor configured to:
   determine a thermal condition of the slave UE within a platoon of UEs;
   perform synchronization with a first synchronization source indirectly responsive to a determination that the thermal condition of the slave UE exceeds a threshold, wherein the first synchronization source comprises at least a global navigation satellite system (GNSS) or a base station, and wherein the at least one processor is further configured to:

deactivate a direct synchronization connection with the first synchronization source based at least on the thermal condition exceeding the threshold, wherein the synchronization is maintained indirectly with the first synchronization source through a master UE.

2. The apparatus of claim 1, wherein the at least one processor is further configured to:
receive, from a master UE within the platoon of UEs, sidelink synchronization signals (SLSS) to synchronize indirectly to the first synchronization source through the master UE.

3. The apparatus of claim 2, wherein the master UE operates as a second synchronization source.

4. The apparatus of claim 1, wherein the at least one processor is further configured to:
activate the direct synchronization connection with the first synchronization source on a periodic basis with reduced capabilities to verify or update a second synchronization source through the master UE.

5. The apparatus of claim 1, wherein the at least one processor is further configured to:
broadcast, to the platoon of UEs, an indication comprising at least one of an updated thermal condition, availability of directly synchronizing with the first synchronization source, a power capacity, or any combinations thereof.

6. The apparatus of claim 5, wherein the indication indicates that the slave UE is capable to operate as a master UE based at least on one of the updated thermal condition, the availability of directly synchronizing with the first synchronization source, the power capacity, or any combinations thereof.

7. The apparatus of claim 6, wherein in response to the slave UE switching to operate as the master UE, the at least one processor is further configured to:
provide, to the platoon of UEs, sidelink synchronization signals (SLSS) to allow one or more of the slave UEs within the platoon of UEs to indirectly synchronize with the first synchronization source.

8. The apparatus of claim 1, wherein the synchronization is performed directly with the first synchronization source in response to a determination that the thermal condition of the slave UE is below the threshold.

9. The apparatus of claim 1, wherein the synchronization is performed indirectly with the first synchronization source through a master UE within the platoon of UEs in response to the determination that the thermal condition exceeds the threshold.

10. A method of wireless communication of a slave user equipment (UE), comprising:
determining a thermal condition of the slave UE within a platoon of UEs;
performing synchronization with a first synchronization source indirectly responsive to a determination that a determined thermal condition of the slave UE exceeds a threshold, wherein the first synchronization source comprises at least a global navigation satellite system (GNSS) or a base station, and the method further comprising:
deactivating a direct synchronization connection with the first synchronization source based at least on the thermal condition exceeding the threshold, wherein the synchronization is maintained indirectly with the first synchronization source through a master UE.

11. The method of claim 10, further comprising:
receiving, from a master UE within the platoon of UEs, sidelink synchronization signals (SLSS) to synchronize indirectly to the first synchronization source through the master UE, wherein the master UE operates as a second synchronization source.

12. The method of claim 10, further comprising:
activating the direct synchronization connection with the first synchronization source on a periodic basis with reduced capabilities, wherein the direct synchronization connection is activated to verify or update a second synchronization source through the master UE.

13. The method of claim 10, further comprising:
broadcasting, to the platoon of UEs, an indication comprising at least one of an updated thermal condition, availability of directly synchronizing with the first synchronization source, a power capacity, or any combinations thereof.

14. The method of claim 13, wherein the indication indicates that the slave UE is capable to operate as a master UE based at least on one of the updated thermal condition, the availability of directly synchronizing with the first synchronization source, the power capacity, or any combinations thereof.

15. The method of claim 14, wherein in response to the slave UE switching to operate as the master UE, the method further comprising:
providing, to the platoon of UEs, sidelink synchronization signals (SLSS) to allow one or more of the slave UEs within the platoon of UEs to indirectly synchronize with the first synchronization source.

16. The method of claim 10, wherein the synchronization is performed directly with the first synchronization source in response to a determination that the thermal condition of the slave UE is below the threshold.

17. The method of claim 10, wherein the synchronization is performed indirectly with the first synchronization source through a master UE within the platoon of UEs in response to a determination that the thermal condition exceeds the threshold.

* * * * *